US009578302B2

(12) United States Patent
Suh

(10) Patent No.: US 9,578,302 B2
(45) Date of Patent: *Feb. 21, 2017

(54) BROADCAST TRANSMITTER, BROADCAST RECEIVER AND 3D VIDEO DATA PROCESSING METHOD THEREOF

(71) Applicant: LG ELECTRONICS INC., Seoul (KR)

(72) Inventor: Jong Yeul Suh, Seoul (KR)

(73) Assignee: LG ELECTRONICS INC., Seoul (KR)

( * ) Notice: Subject to any disclaimer, the term of this patent is extended or adjusted under 35 U.S.C. 154(b) by 0 days.

This patent is subject to a terminal disclaimer.

(21) Appl. No.: 14/737,167

(22) Filed: Jun. 11, 2015

(65) Prior Publication Data

US 2015/0350625 A1    Dec. 3, 2015

Related U.S. Application Data

(63) Continuation of application No. 13/378,522, filed as application No. PCT/KR2010/001363 on Mar. 4, 2010, now Pat. No. 9,088,817.

(Continued)

(51) Int. Cl.
*H04N 13/00* (2006.01)
*H04N 21/2343* (2011.01)
(Continued)

(52) U.S. Cl.
CPC ...... *H04N 13/0059* (2013.01); *H04N 13/0029* (2013.01); *H04N 13/0048* (2013.01);
(Continued)

(58) Field of Classification Search
None
See application file for complete search history.

(56) References Cited

U.S. PATENT DOCUMENTS

2009/0122134 A1    5/2009  Joung et al.

FOREIGN PATENT DOCUMENTS

| CN | 1771734 A | 5/2006 |
|---|---|---|
| CN | 1954606 A | 4/2007 |

(Continued)

*Primary Examiner* — Dakshesh Parikh
(74) *Attorney, Agent, or Firm* — Dentons US LLP

(57) ABSTRACT

A broadcast transmitter/receiver and a 3D video data processing method of the same are disclosed. A 3D video data processing method of a broadcast transmitter includes encoding 3D video data, using an encoder, generating system information included in 3D video metadata, using a system information processor, outputting a transport stream by inserting frame sync information in the 3D vide data and multiplexing the 3D video data and system information, using a TP encoder, and modulating and transmitting the transport stream, using a transmitting unit. A 3D video data processing method of a broadcast receiver includes receiving a broadcasting signal including 3D video data having frame sync information and system information, using a reception unit, demultiplexing the 3D video data and the system information, using a demultiplexer, acquiring 3D video metadata by parsing the system information, using a system information processor, acquiring the frame sync information from the 3D video data and outputting the video data frame-sequentially based on the acquired frame sync information, using a sync controller, and decoding the 3D video data based on the 3D metadata, using a decoder.

10 Claims, 11 Drawing Sheets

Related U.S. Application Data

(60) Provisional application No. 61/187,635, filed on Jun. 16, 2009.

(51) Int. Cl.
*H04N 21/2362* (2011.01)
*H04N 21/43* (2011.01)
*H04N 21/434* (2011.01)
*H04N 21/63* (2011.01)
*H04N 19/597* (2014.01)
*H04H 20/95* (2008.01)

(52) U.S. Cl.
CPC ....... *H04N 13/0066* (2013.01); *H04N 19/597* (2014.11); *H04N 21/2362* (2013.01); *H04N 21/234327* (2013.01); *H04N 21/4305* (2013.01); *H04N 21/4345* (2013.01); *H04N 21/631* (2013.01); *H04H 20/95* (2013.01)

(56) References Cited

FOREIGN PATENT DOCUMENTS

| | | | | |
|---|---|---|---|---|
| CN | 101180831 A | 5/2008 | | |
| KR | 10-2005-0111379 A | 11/2005 | | |
| KR | WO 2005114998 A1 * | 12/2005 | ......... | H04N 13/0059 |
| KR | 10-2006-0105449 A | 10/2006 | | |
| KR | 10-2008-0037593 A | 4/2008 | | |
| KR | WO 2008051041 A1 * | 5/2008 | ....... | H04N 21/64792 |
| KR | 10-2008-0063323 A | 7/2008 | | |
| WO | 2005069630 | 7/2005 | | |
| WO | 2005114998 A1 | 12/2005 | | |
| WO | 2006104326 | 10/2006 | | |
| WO | 2007047736 | 4/2007 | | |
| WO | 2008051041 | 5/2008 | | |

\* cited by examiner

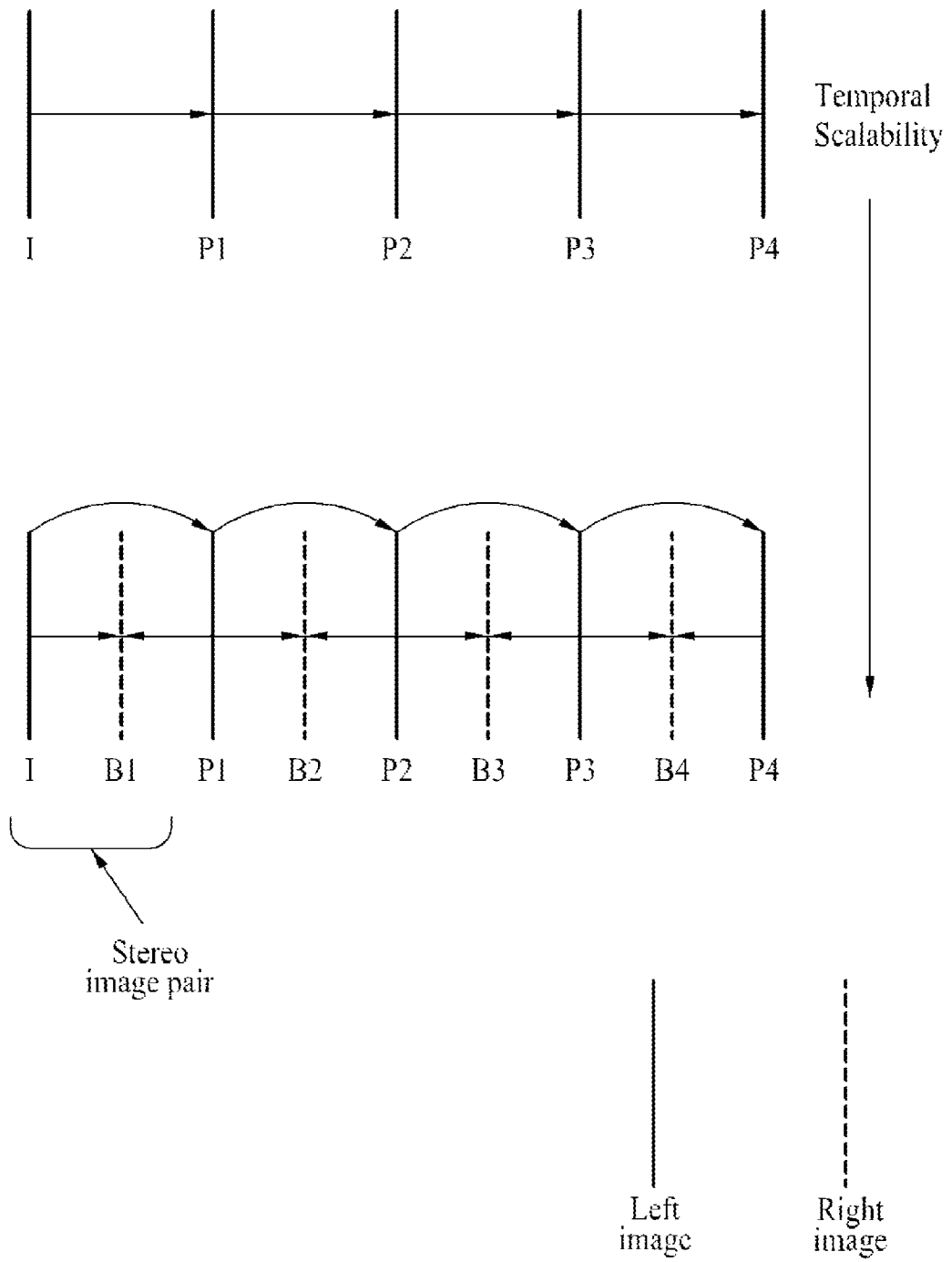

Fig. 3

| Syntax | No.of Bits | Format |
|---|---|---|
| terrestrial_virtual_channel_table_section(){ | | |
|     table_id | 8 | O×C8 |
|     section_syntax_indicator | 1 | '1' |
|     private_indicator | 1 | '1' |
|     reserved | 2 | '11' |
|     section_length | 12 | uimsbf |
|     transport_stream_id | 16 | uimsbf |
|     reserved | 2 | '11' |
|     version_number | 5 | uimsbf |
|     current_next_indicator | 1 | bslbf |
|     section_number | 8 | uimsbf |
|     last_section_number | 8 | uimsbf |
|     protocol_version | 8 | uimsbf |
|     num_channels_in_section | 8 | umsbf |
|     for (i=0; i<num_channels_in_section; i++){ | | |
|         short_name | 7'16 | uimsbf |
|         reserved | 4 | '1111' |
|         major_channel_number | 10 | uimsbf |
|         major_channel_number | 10 | uimsbf |
|         modulation_mode | 8 | uimsbf |
|         carrier_frequency | 32 | uimsbf |
|         channel_TSID | 16 | uimsbf |
|         program_number | 16 | uimsbf |
|         ETM_location | 2 | uimsbf |
|         access_controlled | 1 | bslbf |
|         hiddden | 1 | bslbf |
|         reserved | 2 | '11' |
|         hide_guide | 1 | bslbf |
|         reserved | 3 | '111' |
|         service_type | 6 | uimsbf |
|         source_id | 16 | uimsbf |
|         reserved | 6 | '111111' |
|         descriptors_length | 10 | uimsbf |
|         for (i=0; i<N; i++){ | | |
|             descriptor() | | |
|         } | | |
|     } | | |
|     reserved | 6 | '111111' |
|     additional_descriptors_length | 10 | uimsbf |
|     for (j=0; j<N; j++_{ | | |
|         additional_descriptor() | | |
|     } | | |
|     CRC_32 | 32 | rpchof |
| } | | | service_type → Representing That 3DTV Service Is Provided descriptor() → Including Information Of Two Video Streams Composing Stereoscopic 3DTV Service

Fig. 4

| Syntax | No. of bits | Format |
|---|---|---|
| 3DTV_service_location_descriptor_VCT ( ) { | | |
|     descriptor_tag | 8 | 0xTBD |
|     descriptor_length | 8 | uimsbf |
|     reserved | 3 | '111' |
|     PCR_PID | 13 | uimsbf |
|     reserved | 1 | '1' |
|     number_elements | 7 | uimsbf |
|     for (j=0; j<number_elements; j++) { | | |
|         reserved | 1 | '1' |
|         base_view_flag | 1 | bslbf |
|         left_right_view | 1 | bslbf |
|         elementary_PID | 13 | uimsbf |
|         stream_type | 8 | uimsbf |
|         frame_rate_code | 16 | uimsbf |
| } | | |

Fig. 5

| Syntax | No. of bits | Mnemonic |
|---|---|---|
| TS_program_map_section() { | | |
|     table_id | 8 | uimsbf |
|     section_syntax_indicator | 1 | bslbf |
|     '0' | 1 | bslbf |
|     reserved | 2 | bslbf |
|     section_length | 12 | uimsbf |
|     program_number | 16 | uimsbf |
|     reserved | 2 | bslbf |
|     version_number | 5 | uimsbf |
|     current_next_indicator | 1 | bslbf |
|     section_number | 8 | uimsbf |
|     last_section_number | 8 | uimsbf |
|     reserved | 3 | bslbf |
|     PCR_PID | 13 | uimsbf |
|     reserved | 4 | bslbf |
|     program_info_length | 12 | uimsbf |
|     for(i=0; i<N; i++) { | | |
|         descriptor() | | |
|     } | | |
|     for(i=0; i<N1; i++) { | | |
|         stream_type | 8 | uimsbf |
|         reserved | 3 | bslbf |
|         elementary_PID | 13 | uimsbf |
|         reserved | 4 | bslbf |
|         ES_info_length | 12 | uimsbf |
|         for(i=0; i<N2; i++) { | | |
|             descriptor() | | |
|         } | | |
|     } | | |
|     CRC_32 | 32 | rpchof |
| } | | |

Location Of 3DTV_service_lacation_descriptor_PMT

Fig. 6

| Syntax | No. of bits | Format |
|---|---|---|
| 3DTV_service_location_descriptor_PMT ( ) { | | |
| descriptor_tag | 8 | 0xTBD |
| descriptor_length | 8 | uimsbf |
| reserved | 6 | bslbf |
| base_view_flag | 1 | bslbf |
| left_right_view | 1 | bslbf |
| frame_rate_code | 16 | uimsbf |
| } | | |

FIG. 7

| Syntax | No. of bits | Mnemonic |
|---|---|---|
| adaptation_field() { | | |
|   adaptation_field_length | 8 | uimsbf |
|   if(adaptation_field_length>0) { | | |
|     discontinuity_indicator | 1 | bslbf |
|     random_access_indicator | 1 | bslbf |
|     elementary_stream_priority_indicator | 1 | bslbf |
|     PCR_flag | 1 | bslbf |
|     OPCR_flag | 1 | bslbf |
|     splicing_point_flag | 1 | bslbf |
|     transport_private_data_flag | 1 | bslbf |
|     adaptation_field_extension_flag | 1 | bslbf |
|     if(PCR_flag =='1') { | | |
|       program_clock_reference_base | 33 | uimsbf |
|       Reserved | 6 | bslbf |
|       Program_clock_reference_extension | 9 | uimsbf |
|     } | | |
|     if(OPCR_flag =='1') { | | |
|       original_program_clock_reference_base | 33 | uimsbf |
|       Reserved | 6 | bslbf |
|       original_program_clock_reference_extension | 9 | uimsbf |
|     } | | |
|     if (splicing_point_flag =='1') { | | |
|       splice_countdown | 8 | tcimsbf |
|     } | | |
|     if (transport_private_data_flag =='1') { | | |
|       transport_private_data_length | 8 | uimsbf |
|       for(i=0; i<transport_private_data_length; i++) { | | |
|         private_data_byte | 8 | bslbf |
|       } | | |
|     } | | |
|     if (adaptation_field_extension_flag =='1') { | | |
|       adaptation_field_extension_length | 8 | uimsbf |
|       ltw_flag | 1 | bslbf |
|       piecewise_rate_flag | 1 | bslbf |
|       seamless_splice_flag | 1 | bslbf |
|       Reserved | 5 | bslbf |
|       if(ltw_flag =='1') { | | |
|         ltw_valid_flag | 1 | bslbf |
|         ltw_offset | 15 | uimsbf |
|       } | | |
|       if(piecewise_rate_flag =='1') { | | |
|         reserved | 2 | bslbf |
|         piecewise_rate | 22 | uimsbf |
|       } | | |
|       if (seamless_splice_flag =='1') { | | |
|         Splice_type | 4 | bslbf |
|         DTS_next_AU[32..30] | 3 | bslbf |
|         marker_bit | 1 | bslbf |
|         DTS_next_AU[29..15] | 15 | bslbf |
|         marker_bit | 1 | bslbf |
|         DTS_next_AU[14..0] | 15 | bslbf |
|         marker_bit | 1 | bslbf |
|       } | | |
|       for (i=0; i<N; i++) { | | |
|         reserved | 8 | bslbf |
|       } | | |
|     } | | |
|     for (i=0; i<N; i++) { | | |
|       stuffing_byte | 8 | bslbf |
|     } | | |
|   } | | |
| } | | |

| Syntax | No. of bits | Format |
|---|---|---|
| SVC_sync_data_byte ( ) { | | |
|     data_type | 8 | 0xTBD |
|     frame_num | 32 | uimsbf |
| } | | |

BROADCAST TRANSMITTER, BROADCAST RECEIVER AND 3D VIDEO DATA PROCESSING METHOD THEREOF

This application is a continuation application of U.S. patent application Ser. No. 13/378,522 filed Dec. 15, 2011, which is a National Stage filing of International Application No. PCT/KR2010/001363 filed Mar. 4, 2010, and claims the benefit to and priority of U.S. Provisional Application No. 61/187,635 filed Jun. 16, 2009, all of which are incorporated by reference for all purposes as if fully set forth herein.

TECHNICAL FIELD

The present invention relates to a broadcast transmitter, a broadcast receiver and 3D video processing methods of the broadcast transmitter and receiver, more specifically, a broadcast transmitter and a broadcast receiver that process video data and a 3D video data processing method, in case that a plurality of video streams are transmitted from a 3D broadcasting system.

BACKGROUND ART

In general, 3D dimensional images use a stereo vision of human eyes to provide a three dimensional effect. Humans may feel perspective via binocular parallax generated by a distance between two eyes which are distant approximately 65 mm from each other. because of that, 3D images provides images made for each of right and left human eyes to see corresponding plane image related thereto, such that the dimensional and perspective effect may be embodied.

A display method of such the 3D image may include a stereoscopic, volumetric and holographic method. According to the stereoscopic method, a left view image and a right view image are provided for human right and left eyes, respectively, such that human right and left eyes view the left and right view images, respectively, to recognize three dimensional effect.

DISCLOSURE OF INVENTION

Technical Problem

To solve the problems, an object of the present invention is to provide broadcasting environments efficient and convenient of users by transmitting and receiving information of 3D video data and by processing the 3D video data, in case a 3D broadcasting system transport two video streams for stereoscopic display.

Solution to Problem

To achieve these objects and other advantages and in accordance with the purpose of the invention, as embodied and broadly described herein, a 3D video data processing method of a broadcast transmitter includes encoding 3D video data, using an encoder; generating system information included in 3D video metadata, using a system information processor; outputting a transport stream by inserting frame sync information in the 3D vide data and multiplexing the 3D video data and system information, using a TP encoder; and modulating and transmitting the transport stream, using a transmitting unit.

In another aspect to the present invention, a 3D video data processing method of a broadcast receiver includes receiving a broadcasting signal including 3D video data having frame sync information and system information, using a reception unit; demultiplexing the 3D video data and the system information, using a demultiplexer; acquiring 3D video metadata by parsing the system information, using a system information processor; acquiring the frame sync information from the 3D video data and outputting the video data frame-sequentially based on the acquired frame sync information, using a sync controller; and decoding the 3D video data based on the 3D metadata, using a decoder.

Advantageous Effects of Invention

The present invention has following advantageous effects. According to the present invention, in case of providing a 3D broadcasting service, the broadcast receiver may process 3D video data received to represent 3D effect intended when the 3D broadcasting service is produced.

Furthermore, according to the present invention, an effect on a conventional 2D broadcasting service may be reduced as much as possible and the 3D broadcasting service may be provided simultaneously.

BRIEF DESCRIPTION OF DRAWINGS

The accompanying drawings, which are included to provide further understanding of the disclosure and are incorporated in and constitute a part of this application, illustrate embodiments of the disclosure and together with the description serve to explain the principle of the disclosure.

In the drawings:

FIG. 2 is a diagram illustrating a method for coding a left image and a right image by using a temporal scalable scheme;

FIG. 3 is a diagram illustrating a syntax structure of TVCT including stereo format information according to an embodiment of the present invention, with description of fields of TVCT shown in FIG. 3 being described as follows;

FIG. 4 is a diagram illustrating syntax of a 3DTV service location descriptor provided in the TVCT according to the embodiment of the present invention;

FIG. 5 is a diagram illustrating a syntax structure of PMT including the stereo format information according to the embodiment of the present invention, with description of fields of PMT shown in FIG. 6 as follows;

FIG. 6 is a diagram illustrating syntax of a 3DTV service location descriptor provided in the PMT according to the embodiment of the present invention;

FIG. 7 is a diagram illustrating a syntax structure of an adaptation field of MPEG-2 TS Packet including frame information according to the embodiment of the present invention;

BEST MODE FOR CARRYING OUT THE INVENTION

Figure 1:
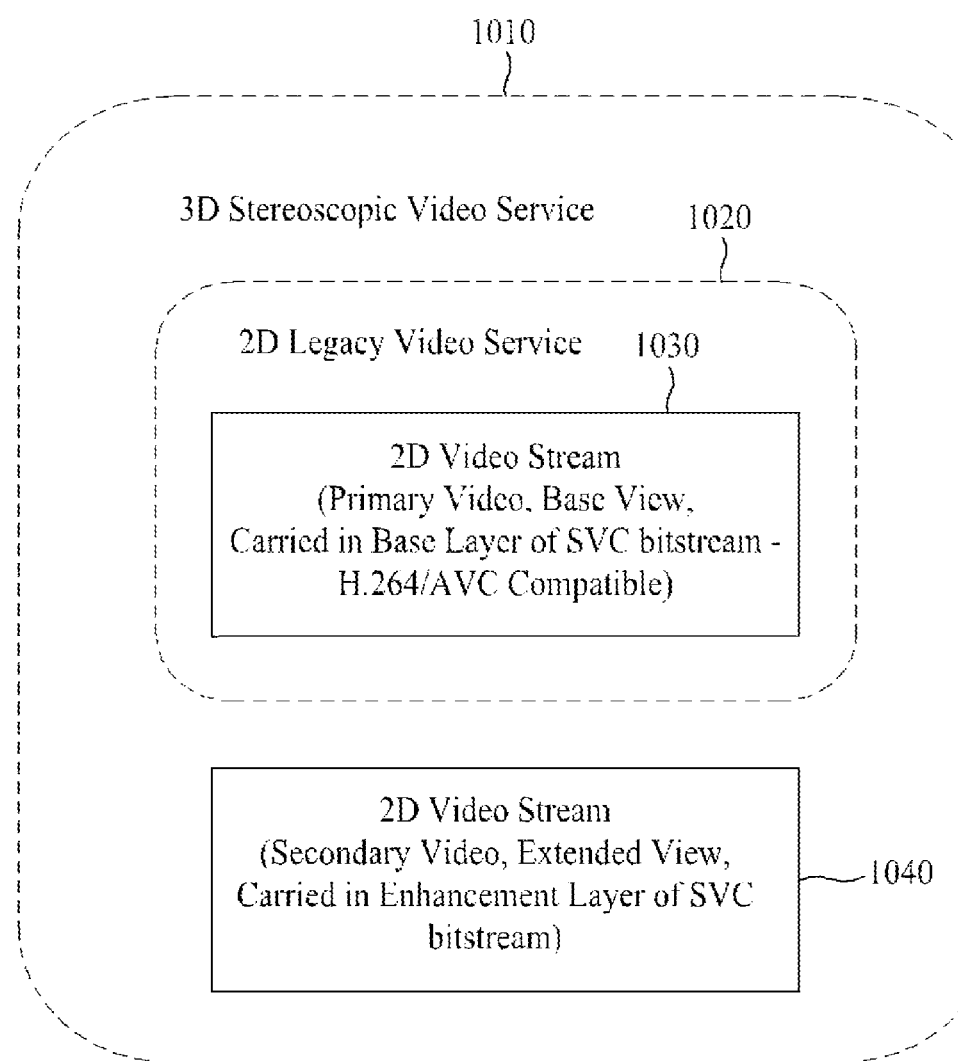
FIG. 1 is a conceptual diagram illustrating data configuration of a 3D broadcasting service according to an exemplary embodiment of the present invention.

Reference will now be made in detail to the specific embodiments of the present invention, examples of which are illustrated in the accompanying drawings. Wherever possible, the same reference numbers will be used throughout the drawings to refer to the same or like parts.

Terminology used in the specification of the present invention may adapt common technical terminology that is well-known broadly in consideration of the functions of the present invention and it may be varied according to purpose or practices of people who pertains to the art and presentation of new technology. In a specific case, the applicant chooses terminology and such terminology is described in the description of the specific embodiments. As a result, the terms may be understood as the meaning based on the content of the description, not as the simple title.

A method for presenting a 3D image may include a stereoscopic method that considers two view points and a multi view image that considers 3 or more view points. In contrast, a conventional single view image may be referenced to as monoscopic method.

The stereoscopic method uses a pair of right and left images of an identical subject photographed by right and left cameras spaced apart a predetermined distance. The multiple view image method uses 3 or more images photographed by three or more cameras having a predetermined distance or angle. As follows, the present invention will be described, adapting the stereoscopic method as an example. However, a technical subject of the present invention may be applicable to the multi view image method as well. Also, 'stereoscopic' may be referenced to as 'stereo' for convenience sake as follows.

The stereoscopic image or multi view image may be compressed and coded in diverse types including MPEG (Moving Picture Experts Group) to be transmitted.

For example, the stereoscopic image or multi view image may be compressed and coded by using H.264/AVC (Advanced Video Coding). Here, a transmitting system decodes a received image in reverse of H.264/AVC to gain a 3D image.

One of the two left and right view images of the stereoscopic image or one of the multi view images may be assigned as base layer image and the other of the two or the others may be assigned as enhancement layer image. An image of the base layer is coded by using a predetermined method identical to the method used in the monoscopic image and the images of the enhancement layer may be coded and transmitted with respect to only information related to the images of the base layer and the enhancement layer. For example, JPEG, MPEG-2, MPEG-4, H264/AVC and the like may be used in the compression coding method for the base layer image. According to this embodiment of the present invention, H.264/AVC is used. H.264/SVC (Scalable Video Coding) or MVC (Multi-view Video Coding) is used in the compression coding method for a higher layer image according to this embodiment.

2D video contents are standardized in a conventional terrestrial DVT as technical standard. To make 3D TV broadcasting contents serviced, standards of transmission and reception for 3D video contents should be defined. A receiver may receive and processes a broadcasting signal based on the defined transmission and reception standard and the receiver appropriately to support 3D broadcasting service.

ATSC (Advanced Television Systems Committee) standards may be adapted in the present invention to describe the conventional DTV transmission and reception standards.

According to ATSC system, information for processing broadcasting contents may be transmitted and received, with included in system information. For example, the system information may be called as service information and specifically, it includes channel information, program information, event information and so on. In case of the ATSC standards, the system information may be included in PSI/PSIP (Program Specific Information/Program and System Information Protocol) to be transmitted and received and the present invention is not limited thereto. Any protocols capable of transmitting a table format of the system information may be applicable to the present invention.

PSI is an example and it may include PAT (Program Association Table) and PMT (Program Map Table).

PAT is special information transportable by a packet having '0' of PID (Packet ID) and it may transfer PID information of each PMT corresponding to each program. PMT may transport PID information of a transport stream packet and PID information having PCR transported thereto. Here, ID of each program and each video and audio bit stream composing each program may be transported to the transport stream packet. If PMT acquired from PAT is parsed, the information related to correlation among components of the program may be acquired.

According to an embodiment, PSIP may include VCT (Virtual Channel Table), STT (System Time Table), RRT (Rating Region Table), ETT (Extended Text Table), DCCT (Direct Channel Table), DDCSCT (Direct Channel Change Selection Code Table), EIT (Event Information Table), MGT (Master Guide Table).

VCT may transport information related to a virtual channel, for example, channel information to select a channel, PID (Packet Identifier) to receive audio and/or video. If VCT is parsed, PID of audio and video of the broadcasting program may be acquired from channel information transmitted together with a channel title, channel number. STT may transport information of current date and time and RRT may transport information related to areas and authority deliberation for program ratings. ETT may transport auxiliary explanation about the channel and broadcasting program and EIT may transport information related to an event of a virtual channel. DCCT/DCCSCT may transport information related to automatic channel change and MGT may transport a version of each table inside PSIP and PID information.

The transport format of the stereoscopic image includes a single video stream format and a multi video stream format. The single video stream format multiplexes video data of two views to a single video stream to transport and it includes a side-by-side format, top-bottom format, an interlaced format and a checker board format based on a scheme of video format.

The single video stream format is based on video data transmission and reception of a half resolution. A left image and a right image are having a half resolution specially reduced may be arranged in a single video frame according to the format scheme. Because of that, image quality deterioration would occur according to combination of a display type and a video stream format. That is, in case the received video format is different from a display format of a display device, additional resolution would occur. For example, a disadvantage of resolution would occur in that a horizontal resolution is additionally reduced by ½ during the output of the contents having vertical resolution reduced by ½ already, if video data is received in the top-bottom format, with the display format of the display device in the side-by-side method.

However, if the stereoscopic video stream is transported by using temporal scalability, such a display quality deterioration issue may be reduced as much as possible and especially there may be an advantage of utilizing a full spatial resolution. Specifically, a base view video stream compatible with a 2D legacy broadcast receiver is transported based one the multi-video stream format via a base layer and a extended view video stream for 3D broadcasting service may be transported via an enhancement layer by using a temporal SVC (Scalable Video Coding) having two layers.

FIG. 1 is a conceptual diagram illustrating data configuration of a 3D broadcasting service according to an exemplary embodiment of the present invention.

The stereoscopic display is used to describe the 3D broadcasting service according to FIG. 1.

A 3D stereoscopic video service (1010) includes a 2D legacy video service 1020. Although an auxiliary 3D video service may be provided, an infrastructure for the conventional 2D legacy video service could be used and the 3D stereoscopic video service may maintain compatibility with the 2D legacy video service 1020 to use the broadcast transmission and reception device in use currently. The 2D legacy video service 1020 includes transmission and reception of a 2D video stream 1030. For example, the 2D video stream is a primary video stream of the base view coded based on H.264/SVS compatible with H.264/AVC and it may be transported via a base layer.

To present the 3D stereoscopic video service 1010, an auxiliary video stream has to be transported rather than the 2D video stream 1030 including in the 2D legacy video service 1020. The auxiliary video stream shown in FIG. 1 is a 2D video stream 1040. For example, the auxiliary video stream 1040 is a secondary video stream of the extended view coded based on H.264/SVC and it may be transported via an enhancement layer.

Resolution of the above primary video stream and secondary video stream described above in reference to FIG. 1 is one of examples. It is possible to combine various diverse resolutions, for example, a primary video stream of a half resolution, a secondary video stream of the half resolution, a primary video stream of a full resolution and a secondary video stream of the full resolution.

If the 3D stereoscopic vide service 1010 try to display a 3D image in two video streams, information related to the 3D stereoscopic video service and information related to the two video streams has to be transmitted and received additionally. Such the information for the 3D stereoscopic video service 1010 will be referenced to as 3D video metadata which will be defined as table or descriptor for explanation convenience as follows.

FIG. 2 is a diagram illustrating a frame sequential coding method of a left image and a right image which use a temporal scalable coding scheme.

First of all, base view video streams of the left image are arranged per a frame. Base view video streams are arranged per a frame in an order of a frame I, frame P1, frame P3 and frame P4. each of the frames is coded based on relation among the frames and frame P1 may be in reference to 'I' and frame P2 to frame P1 and frame P3 to frame P2 and frame P4 to frame P3.

Video streams of the extended view, that is, right view are arranged frame-sequentially in the video streams of the base view. As shown in FIG. 2, video frames of the extended view are corresponding to a frame B1, frame B2, frame B3 and frame B4. According to the arranged video frames of the extended view, the frame B1 may in reference to the frame I and frame P1. The frame B2 may be in reference to the frame P1 and frame P2. The frame B3 may be in reference to the frame P2 and frame P3. The frame B4 may be in reference to the frame P3 and frame P4.

The receiving system may recover P1, P2, P3 and P4 of the video streams of the base view in reference to prior frame pictures with respect to the frame I and it may recover video data of the extended view in the order of B1, B2, B3, B4 by using both of the video data of the recovered base view and the video data decoded from the received video stream of the extended view.

In case the video streams configured the video streams of the base view and the video streams of the extended view are transported for the 3D broadcasting service as mentioned above, information related to the video streams has to be transported together with the 3D broadcasting service. 3D video metadata may be transported, with being included PMTPMT information included in PSI or TVCT information included in PSIP. Such the transportation of the 3D vide metadata will be described as follows. Hereinafter, the 3D video metadata may be provided in a table type, as 3DTV service location descriptor.

FIG. 3 is a diagram illustrating a syntax structure of TVCT including the stereo format information according to the embodiment of the present invention. Description of fields of TVCT shown in FIG. 3 will be followed.

A 'table_id' field is an 8-bit unsigned integer number field that indicates the type of table section.

A 'section_syntax_indicator' field is a one-bit field which shall be set to '1' for the 'terrestrial_virtual_channel_table_section( )' field.

A 'private_indicator' field is a one-bit field which shall be set to '1'.

A 'section_length' field is a 12-bit field in which the first two bits shall be set to '00', and specifies the number of bytes of the section, starting immediately following the 'section_length' field, and including the CRC.

A 'transport_stream_id' field indicates the 16-bit MPEG-2 Transport Stream (TS) ID. The 'transport_stream_id' field distinguishes a Terrestrial Virtual Channel Table (TVCT) from others that may be broadcast in different PTCs.

A 'version_number' field serving as a 5-bit field indicates a version_number of the Virtual Channel Table (VCT).

A 'current_next_indicator' field is a one-bit indicator. In the case where the 'current_next_indicator' field is set to '1', this means that a transmitted Virtual Channel Table (VCT) is currently applicable. When a bit of the 'current_next_indicator' field is set to '0', this means that the transmitted table is not yet applicable and shall be the next table to become valid.

A 'section_number' field is an 8-bit field which gives the number of this section.

A 'last_section_number' field serving as an 8-bit field specifies the number of the last section (that is, the section with the highest section_number value) of the complete Terrestrial Virtual Channel Table (TVCT).

A 'protocol_version' field serving as an 8-bit unsigned integer field is used to allow, in the future, the table type to carry parameters that may be structured differently than those defined in the current protocol.

A 'num_channels_in_section' field serving as an 8-bit field specifies the number of virtual channels in this VCT section.

A 'short_name' field may indicate the name of the virtual channel, represented as a sequence of one to seven 16-bit code values interpreted in accordance with the UTF-16 standard for unicode character data.

A 'major_channel_number' field indicates a 10-bit number that represents the 'major' channel number associated with the virtual channel being defined in this iteration of the 'for' loop.

A 'minor_channel_number' field indicates a 10-bit number in the range from '0' to '999' so as to represent the 'minor' or 'sub' channel number. This 'minor_channel_number' field together with the 'major_channel_number' field may indicate a two-part channel number, where the minor_channel_number represents the second or right-hand part of the number.

A 'modulation_mode' field including an 8-bit unsigned integer may indicate a modulation mode for the transmitted carrier associated with the virtual channel.

A 'carrier_frequency' field may indicate an allowed carrier frequency.

A 'channel_TSID' field is a 16-bit unsigned integer field in the range from 0x0000 to 0xFFFF. The 'channel_TSID' field represents an MPEG-2 Transport Stream (TS) ID associated with the Transport Stream (TS) carrying the MPEG-2 program referenced by the virtual channel.

A 'program_number' field includes a 16-bit unsigned integer that associates the virtual channel being defined here with the MPEG-2 program association and TS program map tables.

An 'ETM_location' field serving as a 2-bit field specifies the existence and the location of an Extended Text Message (ETM).

An 'access_controlled' field indicates a 1-bit Boolean flag. When the Boolean flag of the 'access_controlled' field is set, this means that accessing the events associated with a virtual channel may be controlled.

A 'hidden' field indicates a 1-bit Boolean flag. When the Boolean flag of the 'hidden' field is set, this means that the virtual channel is not accessed by a user by a direct entry of the virtual channel number.

A 'hide_guide' field indicates a Boolean flag. When the Boolean flag of the hide_guide' field is set to zero '0' for a hidden channel, this means that the virtual channel and virtual channel events may appear in EPG displays.

A 'service_type' field is a 6-bit enumerated type field that shall identify the type of service carried in the virtual channel.

A 'source_id field' includes a 16-bit unsigned integer that identifies the programming source associated with the virtual channel.

A 'descriptors_length' field may indicate a total length (in bytes) of descriptors for a virtual channel.

A 'descriptor( )' field may include zero or more descriptors determined to be appropriate for the 'descriptor( )' field.

An 'additional_descriptors_length' field may indicate a total length (in bytes) of a VCT descriptor list.

A 'CRC_32' field is a 32-bit field which contains a CRC value that ensures a zero output of registers in the decoder defined in Annex A of ISO/IEC 138181 MPEG-2 Systems [8] after processing the entire Terrestrial Virtual Channel Table (TVCT) section.

The service_type field 3010 is a field representing that a broadcasting service provided by a corresponding channel is 3D. For example, a field value of the service_type field 3010 is 0x11, it represents that a corresponding virtual channel provides a 3D broadcasting program including audio streams, video streams and auxiliary video streams to display 3D stereoscopic images.

The descriptor field 3020 includes 3D video metadata, which will be described in reference to FIG. 4 as follows.

FIG. 4 is a diagram illustrating a syntax structure of the 3DTV service location descriptor included in TVCT according to the embodiment of the present invention.

The number_elements field represents the number of video elements composing the corresponding virtual channel. The broadcast receiver receives the 3DTV service location descriptor may parse information included in following fields as many as the number of video elements composing the corresponding virtual channel.

The base_view_flag field represents whether the corresponding video elements are video elements of the base view. The information included in the 3DTV service location descriptor may include information for the 3DTV broadcasting service. For example, the information may duplicate-declares information related to the video of the base view already included in the service location descriptor of TVCT. In this case, a field value of the base_view_flag field is set as '1' to represent whether video data of corresponding elements is video data of the base view. In case only auxiliary information related to the 3DTV is included in the 3DTV service location descriptor, only auxiliary information may be included in this descriptor only if a video stream type represented by the stream_type field is SVC extension and then the base_view_flag may be omitted. Also, it may be inferred that the video element of the base view has right or left view by using information of left_right_view field about the video element of extended view.

The left_right_view field represents whether the corresponding video element is a video element of the left view or of the right view.

The elementary_PID field represents PID of a corresponding video element. The 3DTV service location descriptor defines information related to the video element having PID of the elementary_PID field. The broadcast receiver may acquire information for 3D video display of the video element having a corresponding PID from the 3DTV video location descriptor.

The stream_type field represents a coding type for the corresponding video element, for example, MPEG-2 Video, H.264/AVC, SVC Extension, MVC Extension and the like.

The frame_rate_code field represents a frame rate for the corresponding video element. The frame rate may be defined by using a predetermined code value, for example, Table 6.2 of ATSC A/53 Part 4. In addition, a frame rate of the base layer and a frame rate of the enhancement layer are added up to present a final rate.

FIG. 5 is a diagram illustrating syntax of PMT including the stereo format information according to the embodiment of the present invention. Description for fields of PMT shown in FIG. 5 is as follows.

A 'table_id' field is an 8-bit field which shall always be set to '0x02' in a 'TS_program_map_section' field.

A 'section_syntax_indicator' field is a 1-bit field which shall be set to '1'.

A 'section_length' field is a 12-bit field in which first two bits shall be set to '00', and specifies the number of bytes of the section starting immediately the 'section_length' field, and including the CRC.

A 'program_number' field is a 16-bit field, which specifies the program to which the 'program_map_PID' field is applicable.

A 'version_number' field is a 5-bit field, which indicates the version number of the 'TS_program_map_section' field.

A 'current_next_indicator' field is a 1-bit field. When a bit of the 'current_next_indicator' field is set to '1', this means that the transmitted 'TS_program_map_section' field is currently applicable. When a bit of the 'current_next_indicator' field is set to '0', this means that the transmitted 'TS_program_map_section' field is not yet applicable and shall be the next 'TS_program_map_section' field to become valid.

A 'section_number' field includes a value of an 8-bit field which shall be '0x00'.

A 'last_section_number' field includes a value of an 8-bit field which shall be '0x00'.

A 'PCR_PID' field is a 13-bit field indicating the PID of the Transport Stream (TS) packets which shall contain the PCR fields valid for the program specified by a 'program_number' field. In the case where no PCR is associated with a program definition for private streams, then this field shall take the value of '0x1FFF'.

A 'program_info_length' field is a 12-bit field, the first two bits of which shall be '00'. The 'program_info_length' field specifies the number of bytes of descriptors immediately following the 'program_info_length' field.

A 'stream_type' field is an 8-bit field specifying the type of elementary stream or payload carried within packets with the PID whose value is specified by the 'elementary$_{13}$PID' field. In addition, the 'stream_type' field may indicate a coding type of a corresponding video element. As an exemplary coding type, a JPEG, an MPEG-2, an MPEG-4, an H.264/AVC, an H.264/SVC or H.264/MVC scheme may be used.

An 'elementary_PID' field is a 13-bit field specifying a PID of the Transport Stream (TS) packets which carry the associated elementary stream or payload. This PID may be used as a PID of primary video data or secondary video data.

An 'ES_info_length' field is a 12-bit field, the first two bits of which shall be '00'. The 'ES_info_length' field may specify the number of bytes of descriptors of the associated elementary stream immediately following the 'ES_info_length' field.

A 'CRC_32' field is a 32-bit field which contains a CRC value that gives a zero output of registers in the decoder defined in Annex B after processing the entire Transport Stream program map section.

The descriptor field 5010 includes information related to the video streams composing the stereoscopic image, which will be described in reference to FIG. 6 as follows.

FIG. 6 is a diagram illustrating a syntax structure of the 3DTV service location descriptor according to the embodiment of the present.

The stereo format descriptor of FIG. 6 is similar to the stereo format descriptor of FIG. 4 and description of the identical fields will be omitted accordingly. Here, in case of PMT, information of stream_type field and elementary_PID for the video element is included in PMT, different from FIG. 4 and description of those fields will be described in reference to FIG. 4.

In general, a SVC decoder operates based on video streams of the base layer and enhancement layer multiplexed and inputted in a single bitstream by the frame. However, in case the video streams of the two layers are transported via a transport packet, a different PID is given to each of the layers such that the video streams may be transported, treated as independent elements. Because of buffering timing difference of the video stream inputted in the receiver, synchronization of frame levels may not accord. Especially, as 3D image display requires acute frame synchronization, frame sync(synchronization) information such as the order and the number of frames should be included in the transport packet. Such frame sync information may be transported, included in a header of MPEG-2 TS Packet or an adaptation field of the header.

FIG. 7 is a diagram illustrating a syntax structure of the adaptation field of MPEG-2 TS Packet including the frame information.

Fields included in the adaptation field of the MPEG-2 TS Packet will be described in reference to FIG. 7.

An adaptation_field_length field is an 8 bit field specifying the number of bytes in the adaptation_field immediately following the adaptation_field_length. The value 0 is for inserting a single stuffing byte in a Transport Stream packet.

A discontinuity_indicator field is a 1 bit field which when set to '1' indicates that the discontinuity state is true for the current Transport Stream packet.

A random_access_indicator is a 1 bit field. When set to '1', it indicates that the next PES packet of the same PID shall contain a PTS field and an elementary stream access point.

A elementary_stream_priority_indicator is a one bit field. It indicates, among packets with the same PID, the priority of the elementary stream data carried within the payload of this Transport Stream packet.

A PCR_flag is a 1 bit flag. A value of '1' indicates that the adaptation_field contains a PCR field. A value of '0' indicates that the adaptation field does not contain any PCR fields.

An OPCR_flag is a 1 bit flag. A value of '1' indicates that the adaptation_field contains an OPCR field. A value of '0' indicates that the adaptation field does not contain any OPCR fields.

A splicing_point_flag is a 1 hit flag. When set to '1', it indicates that a splice_countdown field shall be present in the associated adaptation field, specifying the occurence of a splicing point. A value of '0' indicates that a splice_countdown field is not present in the adaptation field.

A transport_private_data flag is a 1 bit flag. A value of '1' indicates that the adaptation field contains one or more private_data bytes. A value of '0' indicates the adaptation field does not contain any private_data bytes. According to this embodiment, if a transport_data_flag value is '1', the private_data_byte is read.

An adaptation_field_extension_flag is a 1 bit field which when set to '1' indicates the presence of an adaptation field extension. A value of '0' indicates that an adaptation field extension is not present in the adaptation field.

A program_clock_reference (PCR) field is a 42 bit field coded in two parts; one, in units of 1/300 multiplied by the system clock frequency (90 kHz), called program_clock_reference_base (equation 2-1 on page 14), is a 33 bit field and one called program_clock_reference_extension (equation 2-2 on page 14), is a 9 bit field in units of system clock frequency (27 MHz). Its presence is indicated by the PCR_flag. The PCR indicates the intended time of arrival of the byte containing the last bit of the program_clock_reference_base at the input of the system target decoder.

A optional original program reference (OPCR) field is a 42-bit field coded in two parts. These two parts, the base and the extension, are coded identically to the two corresponding parts of the PCR field. The presence of the OPCR is indicated by the OPCR_flag. The OPCR field shall be coded only in Transport Stream packets in which the PCR field is present.

A splice_countdown is an 8 bit field, representing a value which may be positive or negative. A positive value specifies the remaining number of Transport Stream packets, of the same PID, following the associated Transport Stream packet until a splicing point is reached.

A transport_private_data_length is an 8 bit field specifying the number of private_data bytes immediately following the transport_private_data_length field. The number of private_data bytes shall not be such that private data extends beyond the adaptation field. A field value of the transport_private_data_length field may be '5 bytes'.

The private_data_byte field is made to define a new SVC_sync-data_byte as frame sync information, which will be described later.

A adaptation_field_extension_length is an 8 bit field. It indicates the length of the extended adaptation field data following the end of this field.

A ltw_flag (legal_time_window_flag) field is a 1 bit field which when set to '1' indicates the presence of the ltw_offset field.

A piecewise_rate_flag field is a 1 bit field which when set to '1' indicates the presence of the piecewise_rate field.

A seamless_splice_flag field is a 1 bit field which when set to '1' shall satisfy the following conditions.

A ltw_valid_flag(legal time window_valid_flag) field is a 1 bit field which when set '1' indicates that the value of the ltw_offset is valid. A value of '0' indicates that the value in the ltw_offset field is undefined.

A ltw_offset (legal time window_offset) field is a 15 bit field whose value is defined only if the ltw_valid_flag has a value of '1'.

A piecewise_rate field is a 22 bit field and is a positive integer specifying the bit rate over all transport packets of this PID, starting with the packet containing this field and ending with the packet of this PID preceding the packet of this PID containing the next occurrence of this field.

A splice_type field a 4 bit field that is used to derive splice_decoding_delay and max_splice_rate.

A DTS_next_au (decoding_time_stamp_next_access_unit) is a 33 bit field coded in three parts. It indicates the value of the DTS of the next access unit of an unspliced or seamless spliced stream.

A stuffing_byte field is a fixed 8-bit value equal to '1111 1111' that can be inserted by the encoder.

Figures 8, 9:
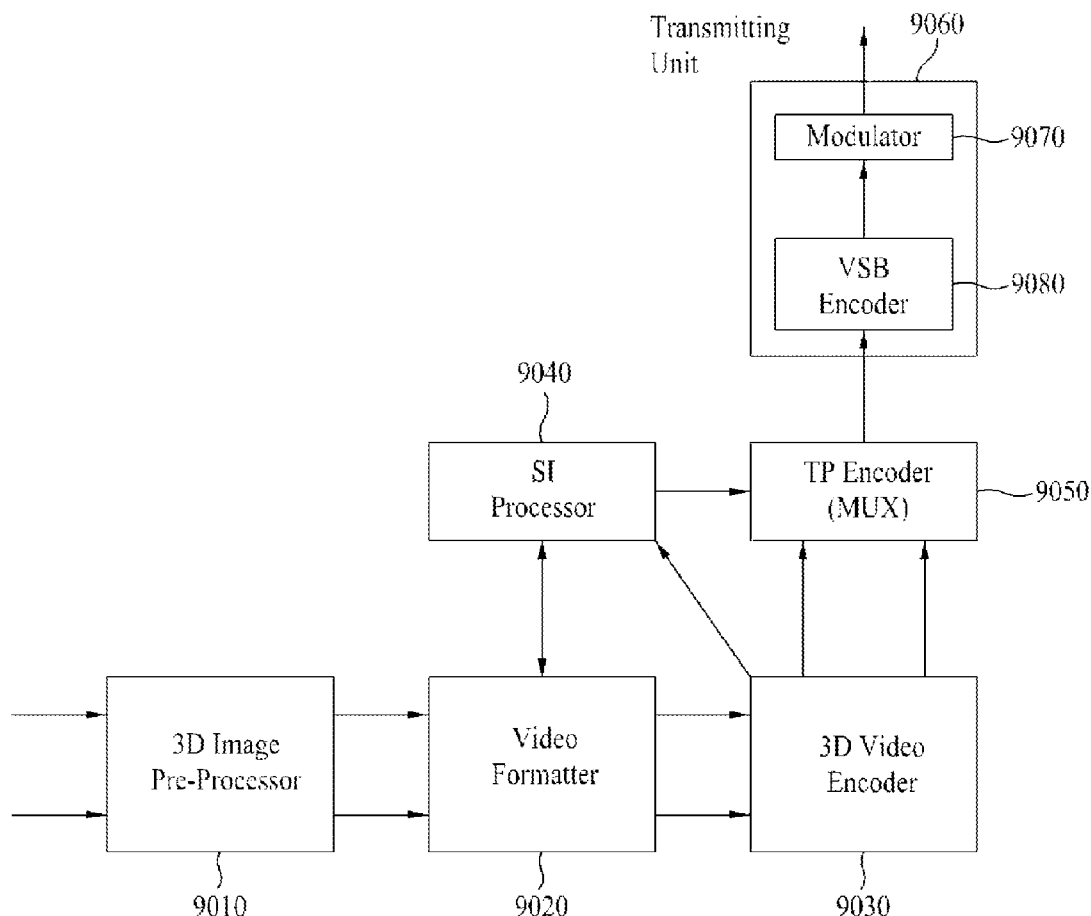
FIG. 8 is a diagram illustrating a syntax structure of frame synchronization information provided in the adaptation field of the MPEG-2 TS Packet.
FIG. 9 is a diagram illustrating a broadcast transmitter according to an exemplary embodiment of the present invention.

FIG. 8 is a diagram illustrating a syntax structure of the frame sync information included in the adaptation field of MPEG-2 TS Packet.

According to FIG. 8, the frame sync information may be defined in the private_data_byte shown in FIG. 7 as SVC_sync_data_byte. Fields defined in the SVC_sync_data_byte field will be described as follows.

A data_type field represents whether a corresponding private data is a SVC_sync_data_byte field.

A frame_num field represents the frame number of a corresponding TS packet. Information of this frame number may be the frame number used in decoding video data or the information may be used as unique identifier of a frame unit allowing the corresponding video data known to belong to a specific stereo images pair. As a result, the receiving system recognizes that the video stream even including different layers is one of the right and left images composing the single stereo image pair if each of the video streams has the equal frame number.

FIG. 9 is a diagram illustrating a broadcast transmitter according to an exemplary embodiment of the present invention.

The broadcast transmitter shown in FIG. 9 includes a 3D image pre-processor 9010 for performing image processing of 3D images, a video formatter 9020 for formatting 3D video data or 3D video streams by processing the 3D images, a 3D video encoder 9030 for encoding the 3D video data according to a coding scheme like a MPEG-2 scheme, a SI (System Information) processor 9040 for generating system information, a TP encoder 9050 for multiplexing the video data and the system information and for encoding TS Packet to output TS, and a transmitting unit 9060 for transmitting a multiplexed broadcasting signal. According to this embodiment, the transmitting unit 9060 may include a modulator 9070 and a VSB encoder 9080. Operations of the elements composing the broadcast transmitter will be described as follows.

Figure 10:
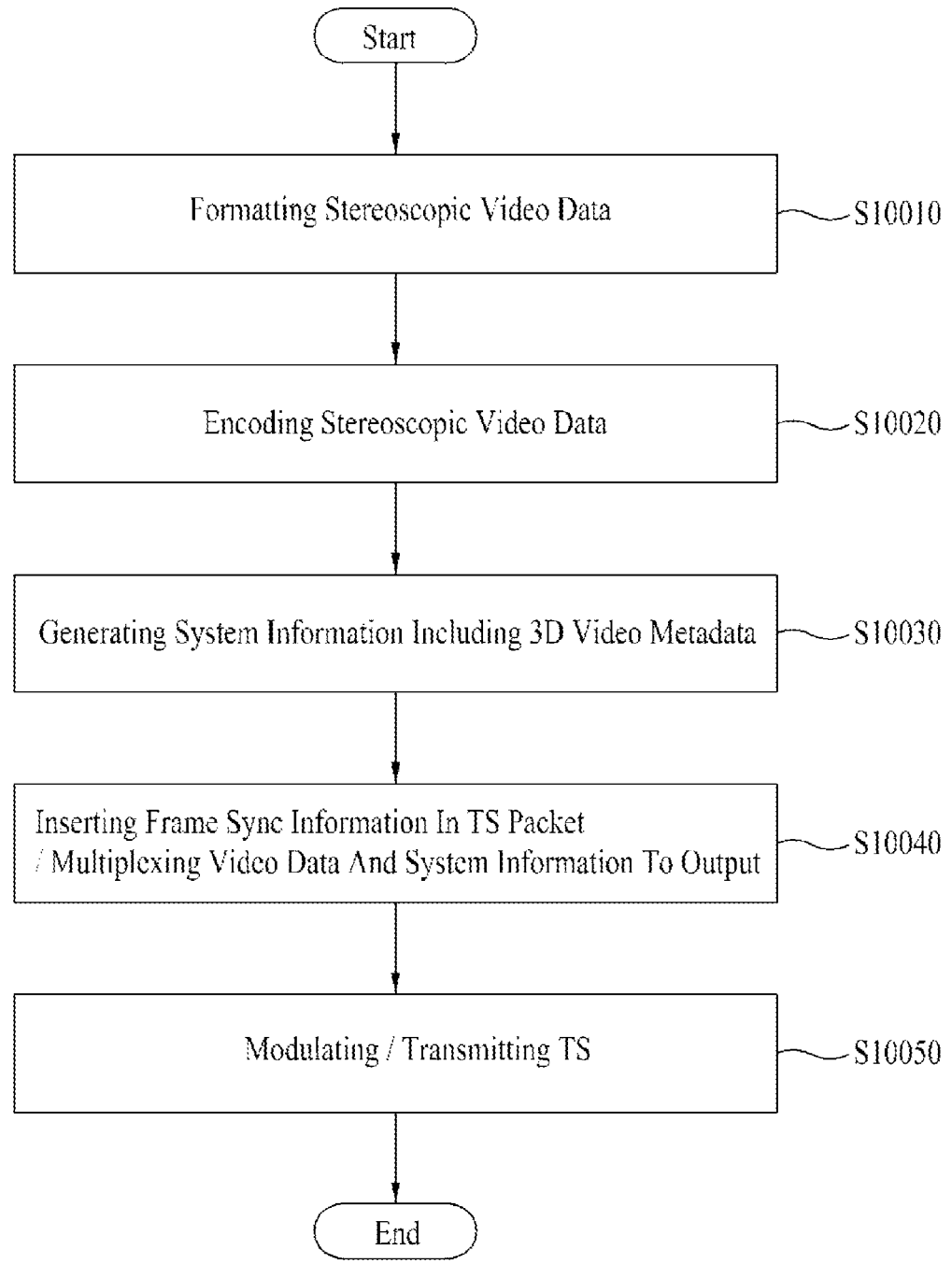
FIG. 10 is a flow chart illustrating a 3D video data processing method of the broadcast transmitter.

FIG. 10 is a flow chart illustrating a 3D video data processing method of the broadcast transmitter.

First of all, the 3D image pre-processor performs process required for 3D images photographed by a plurality of lens and it outputs a plurality of 3D images or video data. For example, if 3D broadcasting service is provided by using the stereoscopic method, images or video data for two views may be outputted.

The broadcast transmitter formats the stereoscopic video data by using the video formatter (S10010). According to this embodiment, the broadcast transmitter resizes the stereo video data based on a multiplexing format and outputs the resized data. The video formatting of the stereoscopic video data includes various image processes required to transport the 3D broadcasting signal, for example, resizing, decimation, interpolating and multiplexing.

The broadcast transmitter encodes the stereoscopic video data by using the 3D video encoder (S10020). According to this embodiment, the broadcast transmitter may encode the stereoscopic video data based on JPEG, MPEG-2, MPEG-4, H.264/AVC and H.264/MVC. Especially, the broadcast transmitter according to this embodiment encodes one of right and left view video data, that is, the base view image in the primary video stream of the base layer based on H.264/SVC compatible with H.264/AVC and it encodes the other of the right and left view video data, that is, the extended view image in the secondary video stream of the enhancement layer based on H.264/SVC to be frame-sequential with the video data of the primary video streams. Here, the video data of the enhancement layer transmitted after encoded may be data of relation required to recover the video data of the enhancement layer from the video data of the primary video streams.

The broadcast transmitter generates system information including 3D video metadata by using the SI processor (S10030). According to this embodiment, the 3D video metadata may be included in PSI/PSIP of the system information, specifically, PMT of PSI and VCT of PSIP. The 3D video metadata may be included in PMT of PSI or VCT of PSIP in a table type as 3DTV service location descriptor.

The broadcast transmitter may insert the above frame sync information in TS packet header and it multiplexes the stereoscopic video data encoded in the 3D video encoder and the system information generated in the SI processor to output TS (S10040). According to this embodiment, the frame sync information may be included in the 3D video data and it may be inserted in the header of the 3D video TS Packet.

The broadcast transmitter may modulates and transmit the output TS by using the transmitting unit (S10050).

Figure 11:
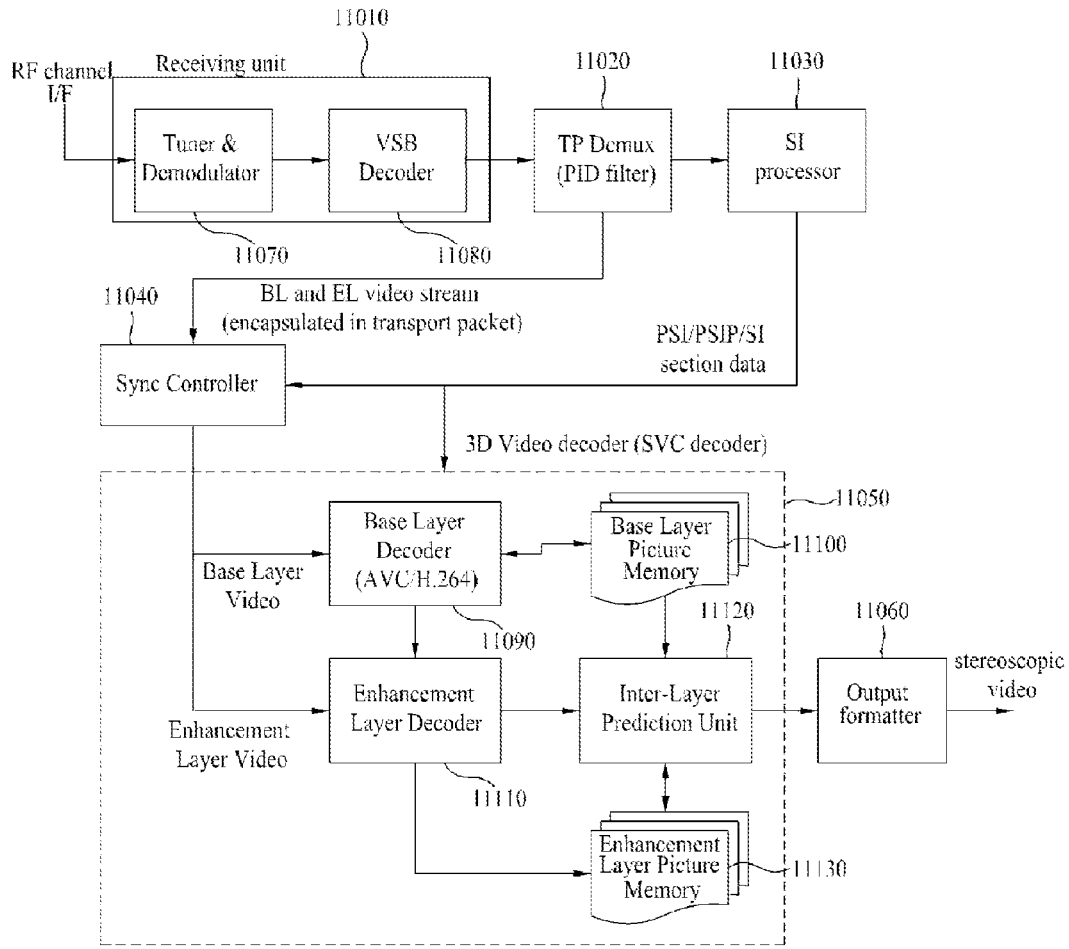
FIG. 11 is a diagram illustrating a broadcast receiver according to an exemplary embodiment of the present invention.

FIG. 11 is a diagram illustrating a broadcast receiver according to an exemplary embodiment of the present invention.

The broadcast receiver shown in FIG. 11 includes a receiving unit 11010 for receiving a broadcasting signal, a TP demultiplexer (PID filter) 11020 for extracting and outputting data streams of video data and system information from the broadcasting signal, a SI processor 11030 for parsing the system information, a sync controller 11040 for controlling sync by buffering 3D video data inputted in a decoder, a 3D video decoder (SVC decoder) 11050 for decoding the 3D video data, and an output formatter 10060 for formatting and outputting the decoded 3D video data. The receiving unit 10010 may include a tuner&demodulator 10070 and VSB decoder 10080. the 3D video decoder 11050 may include a base layer decoder 11090 for decoding video data of a base layer, a base layer picture memory 11010 for storing the video data of the base layer therein, an enhancement layer decoder 11110 for decoding video data of an enhancement layer, an inter-layer prediction unit 11120 for recovering images by predicting images from relation between the video data in reference to the video data of the base layer and the video data of the enhancement layer, and an enhancement layer picture memory 11130 for storing the video data of the enhancement layer therein. In FIG. 11, if the video data is received in the auxiliary stream, that is, two stereoscopic video streams, the inter-layer prediction unit 11120 may be not provided. According to another embodiment, the received two stereoscopic video streams are decoded in the base layer decoder 11090 and the enhancement layer decoder 11110 and they may be bypassed in the interlayer prediction unit 11120 to be outputted to the output formatter 11060.

Figure 12:
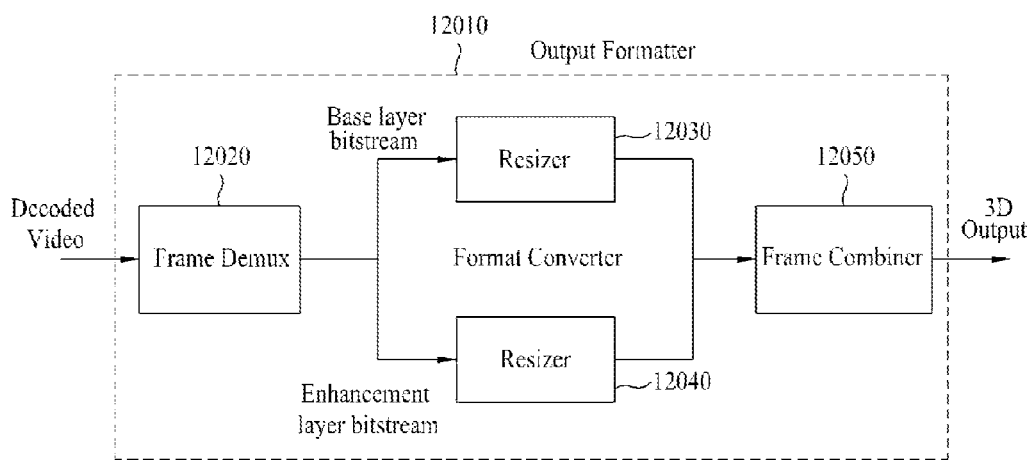
FIG. 12 is a diagram illustrating an output formatter shown in FIG. 11.

FIG. 12 is a diagram illustrating the output formatter shown in FIG. 11 according to the present invention.

The output formatter 12010 shown in FIG. 12 includes a frame demultiplexer 12020, resizers 12030 and 12040, and a frame combiner 12050. The frame demultiplexer 12020 demultiplexes the decoded 3D video data into the video streams of the base layer and the video streams of the enhancement layer by the frame. The resizers 12030 and 12040 resize the video streams of the base layer and the video streams of the enhancement layer. The frame combiner 12050 combines both of the video streams of the base layer and the video streams of the enhancement layer in the order of frames to output the combined streams.

According to this embodiment, the two stereoscopic video streams may be received and decoded and decoded video streams may be outputted to the output formatter 12010. In this case, the decoded video streams may be outputted to the resizers 12030 and 12040, respectively, not passing the frame demultiplexer 12020 or bypassed.

Operations of components included in the broadcast receiver will be described in FIG. 13.

Figure 13:
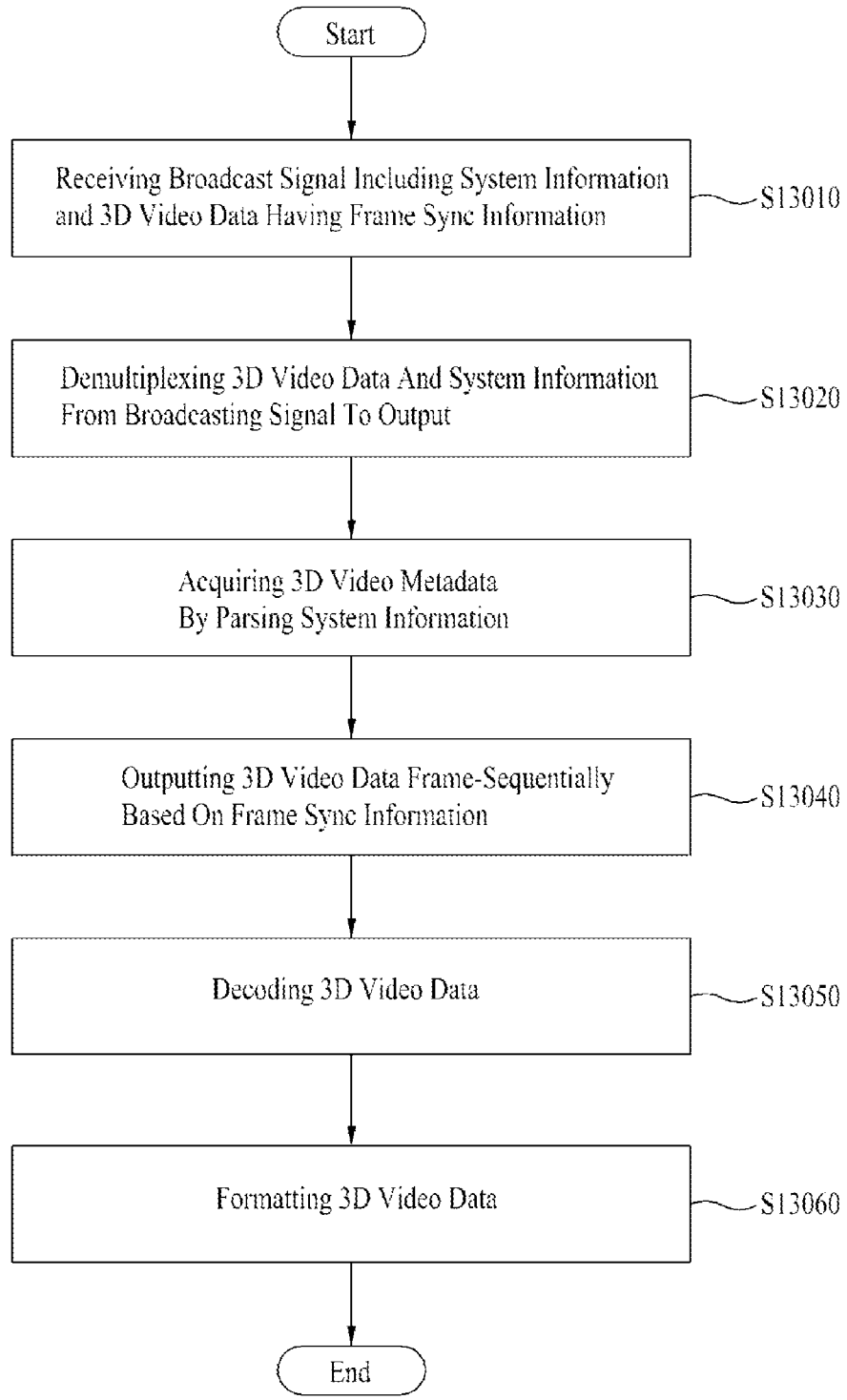
FIG. 13 is a flow chart illustrating a 3D video data processing method of the broadcast receiver.

FIG. 13 is a flow chart illustrating a 3D video data processing method of the broadcast receiver according to an exemplary embodiment.

The broadcast receiver receives and a broadcasting signal including 3D video data having frame sync information and system information by using the receiving unit (S13010).

The broadcast receiver categorizes and outputs the 3D video data and the system information from the broadcasting signal by using the demultiplexer (S13020). The broadcast receiver categorizes and 3D video data and the system information via PID to output. The 3D video data, specifically, the base view video streams of the base layer and the extended view video streams of the enhancement layer may be outputted to the base layer decoder and the enhancement layer decoder, correspondingly, via the synch controller and also the system information may be outputted to the SI processor.

According to this embodiment, the frame sync information may be included in the video data. The frame sync information may be included in the header of TS Packet of the base view video streams and TS Packet of the extended view video streams. In this case, the sync controller acquires the frame sync information from the header of the received video TS Packet to control the sequential output of the 3D video. Alternatively, the demultiplexer acquires the frame sync information and it outputs the acquired information to the sync controller.

The broadcast receiver parses the system information included in the broadcasting signal by using the SI processor to acquire the 3D metadata (S13030). According to the embodiment, the broadcast receiver parses PMT of PSI and VCT of PSIP included in the broadcasting signal by using the SI processor, to acquire the 3D video metadata. The 3D video metadata may include information required for the demultiplexer, decoder and output formatter of the broadcast receiver to process the 3D video data. According to the embodiment, the 3D video metadata may include information presenting whether the 3D broadcasting service is provided, view information representing which view a corresponding video element belongs to, stream type information representing a coding type of the corresponding video element and frame rate information representing a frame rate of the corresponding video element.

The broadcast receiver frame-sequentially outputs the base view video streams of the base layer and the extended view video streams of the enhancement layer by using the sync controller (S13040). According to an embodiment, the broadcast receiver may parse TS Packet of the 3D video data only to acquire the frame sync information added to the header and then it may frame-sequentially output the two video streams to the decoder by the acquired frame sync information. Alternatively, the above operation of the sync controller may be performed, included in the demultiplexer.

The broadcast receiver decodes the 3D video data by using the 3D video decoder (S13050). Here, the broadcast receiver may perform the decoding based on the acquired 3D metadata.

According to an embodiment, the 3D video data inputted in the decoder includes the base view video streams of the base layer and the extended view video streams of the enhancement layer. The decoder may decode the base view video streams of the base layer by using the base layer decoder and store the decoded image in the memory. Hence, the decoder may decode the extended view video streams of the enhancement layer by using the enhancement layer decoder and store decoded extended view video data. The decoder then may predict, recover and store or output images of the extended view from the decoded extended view video data and the stored base view image by using the inter-layer prediction unit. When recovering the extended view images, the inter-layer prediction unit refers to the base view images and extended view images stored in the memory.

The broadcast receiver formats and outputs the decoded stereo video data by using the output formatter (S13060). The formatting of the stereo video data includes processing of the received 3D video data by using the 3D metadata. Also, if multiplexing format of the received stereo video data does not correspond with a multiplexing format provided by the display device or the output type of the video data is different, specifically, 2D output or 3D output, required image processing may be performed, for example, resizing, resolution up-converting, resolution down-converting and the like.

According to an embodiment, the output formatter may receive video streams of the decoded base view and video streams of the decoded extended view. The output formatter may demultiplex the received video streams of each layer in frames by using the frame demultiplexer to output the demultiplexed video streams and it may perform resizing by using the resizer based on the received format and the display format. The output formatter may combine the resized video streams of each of the layers in the frame order by using the frame combiner.

As follows, the 3D video data processing method of the broadcast receiver and the sync control operation will be described in detail.

First of all, in case the 3D video metadata is acquired via TVCT or via PMT, the operation of the broadcast receiver will be described.

(1) In Case of Receiving the 3D Metal Data Via TVCT:

The broadcast receiver may determine by using the service_type field of TVCT whether a virtual channel provides the 3D broadcasting service. If it is determined that the 3D broadcasting service is provided, the broadcast receiver acquires elementary_PID information (PIP_P) of the primary video streams by using the 3D video metadata (service location descriptor or 3D service location descriptor). Then, the broadcast receiver acquires elementary_PID information (PID_S) of the secondary video streams by using the 3D video metadata (3D service location descriptor). The broadcast receiver detects output location information, frame rate information and the like for stereoscopic display of the primary video element and secondary video element via the 3D video metadata.

a) In case of viewing in a 2D mode, only video streams corresponding to PID_P are decoded and displayed:

b) in case of viewing in a 3D mode, the video streams corresponding to PID_P and PID_S are decoded, for example, SVC decoding. The broadcast receiver performs resizing, reshaping, 3D format conversion and the like according to characteristics of the display output of the display device, only to output the stereoscopic images.

(2) In Case of Receiving the 3D Image Format Information Via PMT:

The broadcast receiver figures out whether the corresponding stream is the primary video stream or secondary video stream by using 3D video metadata (3DTV service location descriptor) corresponding to each elementary stream or the stream_type of PMT. Here, it may be determined by existing of the 3D video metadata (3DTV service location descriptor) that the corresponding program provides the 3D broadcasting service. If it is determined that the 3D broadcasting service is provided, the broadcast receiver acquires elementary_PID information (PID_P) corresponding to the primary video stream and elementary_PID information (PID_S) corresponding to the secondary video stream and it figures out output location information, frame rate information and the like for the stereoscopic display of the primary video element and secondary video element by using the 3D video metadata. Then, the broadcast receiver performs mapping with the information provided via TVCT by using the program_number field to determine which virtual channel provides the corresponding program.

a) In case of viewing in the 2D mode, only the video streams corresponding to PID_P are decoded and displayed.

b) in case of viewing the 3D mode, the video streams corresponding to PID_P and PID_S are decoded, for example, SVC decoding. Then, the broadcast receiver performs resizing, reshaping, 3D format conversion and the like to output the stereoscopic images.

Diverse embodiments may be applicable to a method for formatting and outputting the decoded primary and secondary video data. Based on a display capacity/type of the display device, resizing may be performed by using the information received for spatially multiplexed format output, for example, side-by-side, top-bottom and line interlacing and then the formatting may be performed. Alternatively, the frame rate conversion may be performed to correspond with a frame rate supported by the display device.

(3) Operation of the Sync Controller:

In general, the SVC decoder is designed based on a single bitstream having the video streams of both base layer and enhancement layer multiplexed by the frame unit. At this time, when the video streams of the two layers are transmitted via TS Packet, a different PID is given to video streams of each layer to be transmitted, treated as independent from each other. Because of difference of bit rates between the two layers and of buffering difference while being inputted to the decoder, signals inputted in the decoder actually may have video stream input with synchronization of the frame levels not corresponding. Especially, the 3D video data requires acute synchronization of frame unit and it is necessary for the sync controller to control the acute synchronization.

The broadcast receiver receives TS Packet corresponding to PID (PID_P) of the primary video stream corresponding to the base layer and TS Packet corresponding to PID (PID_S) corresponding to the secondary video stream corresponding to the enhancement layer. After that, the broadcast receiver buffers the received TS packets in a buffer provided in the sync controller.

Hence, the broadcast receiver acquires frame number information (frame_num) in adaptation field of each TS Packet corresponding to PID_P and PID_S. Here, if transport_private_data_flag is '1', private_data_byte is read and the first byte is an identifier capable of identifying whether corresponding private data is SVC_sync_data_byte and the other four bytes are frame_num information. This frame_num information is used as the frame number used in the video decoding or as identifier of an unique frame unit to figure out that the corresponding video data belongs to a specific stereo image pair. As a result, if different layers have the identical frame_num, the broadcast receiver may figure out that the different layers are right and left images composing a single stereo image pair.

The sync controller stores PID_P and PID_S having the identical frame_num 'K' in an output buffer. The sync controller outputs all of TS packets having PID_P value of ND with 'K' of frame_num to the video decoder from the buffer and it outputs all of transport packets having PID_S value of PID with the identical frame-num 'K' to the video decoder. The above process is repeatedly performed for two layers corresponding to the next frame_num with respect to the next TS packet (frame_num=K+1).

Above specified operation of the sync controller can be performed by the demultiplexer. In other words, the demultiplexer may output the video streams of base layer and enhanced layer sequentially by using the frame sync information as described above. In this case, operation of the demultiplexer may be performed in the same way of the operation of the sync controller as described above.

The method according to the present invention may be represented as program commands which can be performed in diverse computer means to be recoded in computer-readable media. The computer-readable media may include a program command, data file and data structure combinedly or independently. The program command recoded in the media may be designed specially for the present invention or well-known to those skilled in the computer software art. Examples of the computer-readable recording media may include magnetic media such as a hard disk, floppy disk and magnet tape, optical media such as CD-ROM and DVD, magneto-optical media such as floptical disk and a hardware device specially configured to store and perform program commands such ROM, RAM and flash memory. Examples of the program commands may include machine codes made by a compiler and high level language codes performable by computers, using interpreters. The above hardware device may be configured to operate by one software module or more to perform the above operations of the present invention and vise versa.

It will be apparent to those skilled in the art that various modifications and variations can be made in the present invention without departing from the spirit or scope of the invention. Thus, it is intended that the present invention cover the modifications and variations of this invention provided they come within the scope of the appended claims and their equivalents.

MODE FOR THE INVENTION

Various embodiments have been described in the best mode for carrying out the invention.

INDUSTRIAL APPLICABILITY

As apparent from the above description, embodiments of the present invention may be wholly or partially applied to a digital broadcasting system.

The broadcast receiver can process 3D video data such that a 3D effect intended by a 3D broadcast service provider is reflected in the 3D broadcast service. The broadcast receiver can effectively provide a 3D broadcast service simultaneously while minimizing the effect on a conventional 2D broadcast service.

It will be apparent to those skilled in the art that various modifications and variations can be made in the present invention without departing from the spirit or scope of the invention. Thus, it is intended that the present invention cover the modifications and variations of this invention provided they come within the scope of the appended claims and their equivalents.

The invention claimed is:

1. A 3D video data processing method of a broadcast transmitter comprising:
   encoding, by an encoder, 3D video data including a base view component of a base layer and an extended view component of an enhancement layer;
   generating, by a system information processor, signaling information including 3D video metadata; and
   transmitting, by a transmitting unit, a broadcast signal including the encoded 3D video data and the signaling information,
   wherein the broadcast signal further includes frame sync information specifying at least one order value of view components.

2. The 3D video data processing method of claim 1, wherein the frame sync information for the base view component is same as the frame sync information for the corresponding extended view component.

3. The 3D video data processing method of claim 1, wherein frame sync information comprises at least one of a Presentation Time Stamp, PTS, a Picture Order Count, POC, and a display order of the view components.

4. The 3D video data processing method of claim 1, wherein the 3D video metadata comprises at least one of service type information identifying a 3D broadcasting service, view information indicating which of left view and right view is assigned to the base view component, stream type information specifying a type of a program element, and frame rate information representing a rate at which view components are output from a decoding process.

5. The 3D video data processing method of claim 1, wherein the encoding of the 3D video data comprises frame-sequentially encoding the base view component and the extended view component.

6. A broadcast transmitter comprising:
   an encoder for encoding 3D video data including a base view component of a base layer and an extended view component of an enhancement layer;
   a system information processor for generating signaling information including 3D video metadata; and
   a transmitting unit for transmitting a broadcast signal including the encoded 3D video data and the signaling information,
   wherein the broadcast signal further includes frame sync information specifying at least one order value of view components.

7. The broadcast transmitter of claim 6, wherein the frame sync information for the base view component is same as the frame sync information for the corresponding extended view component.

8. The broadcast transmitter of claim 6, wherein frame sync information comprises at least one of a Presentation Time Stamp, PTS, a Picture Order Count, POC, and a display order of the view components.

9. The broadcast transmitter of claim 6, wherein the 3D video metadata comprises at least one of service type information identifying a 3D broadcasting service, view information indicating which of left view and right view is assigned to the base view component, stream type information specifying a type of a program element, and frame rate information representing a rate at which view components are output from a decoding process.

10. The broadcast transmitter of claim 6, wherein the encoding of the 3D video data comprises frame-sequentially encoding the base view component and the extended view component.

* * * * *